United States Patent
Manabe et al.

(10) Patent No.: US 10,693,153 B2
(45) Date of Patent: Jun. 23, 2020

(54) INTERCONNECTOR-ELECTROCHEMICAL REACTION UNIT CELL COMPOSITE BODY, ELECTROCHEMICAL REACTION CELL STACK, AND METHOD OF MANUFACTURING INTERCONNECTOR-ELECTROCHEMICAL REACTION UNIT CELL COMPOSITE BODY

(71) Applicant: MORIMURA SOFC TECHNOLOGY CO., LTD., Komaki-shi, Aichi (JP)

(72) Inventors: Kenta Manabe, Nagoya (JP); Hiroaki Yagi, Komaki (JP); Nobuyuki Hotta, Konan (JP); Shunta Ohashi, Komaki (JP)

(73) Assignee: MORIMURA SOFC TECHNOLOGY CO., LTD., Komaki-shi (JP)

(*) Notice: Subject to any disclaimer, the term of this patent is extended or adjusted under 35 U.S.C. 154(b) by 30 days.

(21) Appl. No.: 15/771,010

(22) PCT Filed: Oct. 25, 2016

(86) PCT No.: PCT/JP2016/081506
§ 371 (c)(1),
(2) Date: Apr. 25, 2018

(87) PCT Pub. No.: WO2017/073530
PCT Pub. Date: May 4, 2017

(65) Prior Publication Data
US 2018/0323448 A1 Nov. 8, 2018

(30) Foreign Application Priority Data
Oct. 28, 2015 (JP) .................. 2015-211746

(51) Int. Cl.
*H01M 8/026* (2016.01)
*H01M 8/0254* (2016.01)
(Continued)

(52) U.S. Cl.
CPC ......... *H01M 8/026* (2013.01); *H01M 8/0254* (2013.01); *H01M 8/021* (2013.01); *H01M 2008/1293* (2013.01); *Y02P 70/56* (2015.11)

(58) Field of Classification Search
CPC .......................... H01M 8/026; H01M 8/0206
See application file for complete search history.

(56) References Cited

U.S. PATENT DOCUMENTS

2005/0014059 A1 1/2005 Kaye
2005/0048351 A1 3/2005 Hood et al.
(Continued)

FOREIGN PATENT DOCUMENTS

EP 2728655 A1 5/2014
JP 3-102771 A 4/1991
(Continued)

OTHER PUBLICATIONS

Communication dated Apr. 15, 2019, from the European Patent Office in counterpart European Application No. 16859760.7.
(Continued)

*Primary Examiner* — Olatunji A Godo
(74) *Attorney, Agent, or Firm* — Sughrue Mion, PLLC

(57) ABSTRACT

An interconnector-electrochemical reaction unit cell composite body includes an electrochemical reaction unit cell and an interconnector. The interconnector has a plurality of combinations of protrusions protruding in the first direction and recesses provided on a side opposite the protrusions in the first direction and being concave toward the protrusions. At least one of the combinations is configured such that, as viewed in the first direction, the bottom of the recess is located on the side toward the open end of the recess. In a section parallel to the first direction, the recess is located within a width t2 of the protrusion in the second direction
(Continued)

orthogonal to the first direction, and the width t1 of the recess in the second direction is smaller than the width t2.

10 Claims, 12 Drawing Sheets

(51) Int. Cl.
*H01M 8/124* (2016.01)
*H01M 8/021* (2016.01)

(56) References Cited

U.S. PATENT DOCUMENTS

| | | | |
|---|---|---|---|
| 2009/0053591 A1* | 2/2009 | Ikeda | H01M 2/1077 |
| | | | 429/159 |
| 2009/0243147 A1 | 10/2009 | Iino et al. | |
| 2010/0047650 A1 | 2/2010 | Iino et al. | |
| 2011/0123904 A1 | 5/2011 | Fujimura et al. | |
| 2013/0130152 A1 | 5/2013 | Couse et al. | |
| 2014/0212784 A1 | 7/2014 | Okuyama et al. | |

FOREIGN PATENT DOCUMENTS

| | | |
|---|---|---|
| JP | 2001-68132 A | 3/2001 |
| JP | 2004-164927 A | 6/2004 |
| JP | 2005-509260 A | 4/2005 |
| JP | 2007-48616 A | 2/2007 |
| JP | 2008-91097 A | 4/2008 |
| JP | 2011-113806 A | 6/2011 |
| WO | 2013/001777 A1 | 1/2013 |

OTHER PUBLICATIONS

Search Report dated Jan. 24, 2017, issued by the International Searching Authority in counterpart International Patent Application No. PCT/JP2016/081506.

Written Opinion dated Jan. 24, 2017, issued by the International Searching Authority in counterpart International Patent Application No. PCT/JP2016/081506 (PCT/ISA/237).

* cited by examiner

| No. | t1a (mm) | t2a (mm) | (t1a/t2a) | h1 (mm) | h2 (mm) | H (mm) | (h1/H) | R4(R2) (mm) | Stress (Max.) (MPa) |
|---|---|---|---|---|---|---|---|---|---|
| 2 | 0.925 | 1.000 | (0.925) | 0.450 | 0.400 | 0.800 | (0.563) | 0.250 | 6.47 |
| 3 | 0.825 | 1.000 | (0.825) | 0.500 | 0.400 | 0.800 | (0.625) | 0.250 | 6.51 |
| 1 | 0.800 | 1.000 | (0.800) | 0.515 | 0.400 | 0.800 | (0.644) | 0.250 | 6.44 |
| 4 | 0.750 | 1.000 | (0.750) | 0.550 | 0.400 | 0.800 | (0.688) | 0.250 | 6.51 |
| 5 | 0.690 | 1.000 | (0.690) | 0.600 | 0.400 | 0.800 | (0.750) | 0.250 | 6.79 |
| 6 | 1.000 | 1.000 | (1.000) | 0.400 | 0.400 | 0.800 | (0.500) | — | 13.8 |

FIG. 12

INTERCONNECTOR-ELECTROCHEMICAL REACTION UNIT CELL COMPOSITE BODY, ELECTROCHEMICAL REACTION CELL STACK, AND METHOD OF MANUFACTURING INTERCONNECTOR-ELECTROCHEMICAL REACTION UNIT CELL COMPOSITE BODY

CROSS-REFERENCE TO RELATED APPLICATIONS

This application is a 371 of International Application No. PCT/JP2016/081506 filed Oct. 25, 2016, which claims priority from Japanese Patent Application No. 2015-211746 filed Oct. 28, 2015.

BACKGROUND OF THE INVENTION

1. Field of the Invention

The present disclosure relates to an interconnector-electrochemical reaction unit cell composite body.

2. Description of the Related Art

A solid oxide fuel cell (hereinafter referred to as "SOFC") has been known as one type of a fuel cell. Each of interconnector-fuel cell unit cell composite bodies (hereinafter referred to as "composite bodies") which constitute the SOFC includes a unit cell of a fuel cell (hereinafter referred to as a "unit cell") and an interconnector. For example, the unit cell includes an electrolyte layer, a cathode, and an anode such that the cathode and the anode face each other in a predetermined direction (hereinafter referred to as the "first direction") and the electrolyte layer intervenes between these electrodes. The interconnector is disposed on one side of the unit cell in the first direction. In general, the composite bodies are utilized in the form of a fuel cell stack in which the composite bodies are arranged in the first direction.

Conventionally, a composite body with an interconnector has been known having a plurality of combinations of protrusions and recesses (see, for example, Patent Document 1). The protrusions protrude in the first direction. The recesses are disposed on the side opposite the protrusions in the first direction and are concave toward the protrusions. In the interconnector having such a configuration, the space defined by the plurality of recesses formed on one side of the interconnector in the first direction serves as a space (a cathode chamber or an anode chamber) through which a reaction gas is caused to flow so as to supply an electrode (a cathode or an anode) disposed on the one side of the interconnector. The plurality of protrusions formed on the one side function as a current corrector electrically connected to that electrode. Notably, the interconnector having such a configuration is manufactured by means of, for example, press working, etching, or the like.

Patent Document 1: WO 2013/001777

3. Problems to be Solved by the Invention

Each of composite bodies constituting a fuel cell stack is exposed to high temperature (for example, 700° C. to 1,000° C.) during operation of the fuel cell stack. Also, stress attributable to clamping force is generated in each of the composite bodies constituting the fuel cell stack. When the above-described conventional interconnector structure is employed, cracks and strain may be generated in the interconnector due to the high temperature and stress. Such cracks and strain of the interconnector are undesirable, because they may cause gas leakage and an increase in contact resistance.

Notably, not only the SOFC but also other types of fuel cells have such a problem. Also, such a problem is common not only to the above-mentioned interconnector-fuel cell unit cell composite body but also to an interconnector-electrolysis cell composite body which includes an interconnector and an electrolysis cell (smallest constituent unit) for generating hydrogen by electrolysis of water. In the present specification, the fuel cell unit cell and the electrolysis cell are collectively referred to as an "electrochemical reaction unit cell," and the interconnector-fuel cell unit cell composite body and the interconnector-electrolysis cell composite body are collectively referred to as an "interconnector-electrochemical reaction unit cell composite body."

The present specification discloses a technique capable of solving the aforementioned problems.

SUMMARY OF THE DISCLOSURE

The technique disclosed in the present specification can be implemented in the following modes.

An interconnector-electrochemical reaction unit cell composite body (1) comprising: an electrochemical reaction unit cell including an electrolyte layer, and a cathode and an anode which face each other in a first direction with the electrolyte layer intervening therebetween; and an interconnector which is disposed on one side of the electrochemical reaction unit cell in the first direction, wherein the interconnector has a plurality of combinations of protrusions protruding in the first direction and recesses provided on a side opposite the protrusions in the first direction and being concave toward the protrusions; and at least one of the plurality of combinations is configured such that, as viewed in the first direction, a bottom of the recess is located on a side toward an open end of the recess with respect to a proximal end of the protrusion, and in a section parallel to the first direction, the recess is located within a range of a width t2 of the protrusion in a second direction orthogonal to the first direction, and a width t1 of the recess in the second direction is smaller than the width t2 of the protrusion. Further, a depth of the recess a depth h of the recess in the first direction and a distance H in the first direction between the open end of the recess and the proximal end of the protrusion satisfy a relation of $0.563 \leq h/H \leq 0.750$. In this interconnector-electrochemical reaction unit cell composite body, the interconnector has a portion which is encompassed within the width t2 of the protrusion and is not encompassed within the width t1 of the recess. Therefore, the concentration of stress at, for example, the corners of the protrusion and recess of the interconnector is mitigated, whereby generation of cracks and strain in the interconnector can be restrained. As a result, the occurrence of gas leakage and an increase in contact resistance can be restrained.

In a preferred embodiment (2) of the interconnector-electrochemical reaction unit cell composite body (1) described above, bottom-side corners of the recess are radiused. In this interconnector-electrochemical reaction unit cell composite body, the concentration of stress at the bottom-side corners of the recess of the interconnector is mitigated, whereby generation of cracks and strain in the interconnector can be restrained more effectively.

In another preferred embodiment (3) of the interconnector-electrochemical reaction unit cell composite body (1) or (2) described above, at least proximal-end-side corners or distal-end-side corners of the protrusion are radiused. In this interconnector-electrochemical reaction unit cell composite body, when a coating is provided on the interconnector, the thickness of the coating can be restrained from decreasing at the corners of the protrusion.

In yet another preferred embodiment (4) of the interconnector-electrochemical reaction unit cell composite body of any of (1) to (3) described above, at least one of the plurality of combinations is configured such that a depth h of the recess in the first direction and a distance H in the first direction between the open end of the recess and the proximal end of the protrusion satisfy a relation of h/H≤0.69. In this interconnector-electrochemical reaction unit cell composite body, it is possible to mitigate the stress concentration more effectively while forming the interconnector into a desired shape.

In yet another preferred embodiment (5) of the interconnector-electrochemical reaction unit cell composite body of any of (1) to (4) described above, at least one of the plurality of combinations is configured such that, in the section parallel to the first direction, the width t1 of the recess and the width t2 of the protrusion satisfy a relation of 0.75≤t1/t2≤0.925. In this interconnector-electrochemical reaction unit cell composite body, it is possible to mitigate the stress concentration more effectively while forming the interconnector into a desired shape.

In yet another preferred embodiment (6) of the interconnector-electrochemical reaction unit cell composite body of any of (1) to (5) described above, the electrolyte layer contains a solid oxide. According to the present interconnector-electrochemical reaction unit cell composite body, the concentration of stress, for example, at the corners of the protrusion and recess of the interconnector is mitigated, whereby generation of cracks and strain in the interconnector can be restrained, in the configuration in which the electrolyte layer contains a solid oxide.

Notably, the technique disclosed in the present specification can be implemented in various modes; for example, an interconnector-electrochemical reaction unit cell composite body (interconnector-fuel cell unit cell composite body or interconnector-electrolysis cell composite body), an electrochemical reaction cell stack (fuel cell stack or electrolysis cell stack) including a plurality of interconnector-electrochemical reaction unit cell composite bodies, an interconnector, and a manufacturing method therefor.

Thus, in another aspect, the present disclosure provides (7) an electrochemical reaction cell stack comprising a plurality of interconnector-electrochemical reaction unit cell composite bodies arranged in a first direction, wherein at least one of the interconnector-electrochemical reaction unit cell composite bodies is an interconnector-electrochemical reaction unit cell composite body according to any one of interconnector-electrochemical reaction unit cell composite bodies (1) to (6) described above.

In a preferred embodiment (8) of the electrochemical reaction cell stack (7) described above, the electrochemical reaction unit cell included in each of the interconnector-electrochemical reaction unit cell composite bodies is a fuel cell unit cell.

In another aspect, the present disclosure provides a method of manufacturing an interconnector-electrochemical reaction unit cell composite body according to any one of interconnector-electrochemical reaction unit cell composite bodies (1) to (6) described above, which comprises: a cell preparation step of preparing the electrochemical reaction unit cell; a press step of forming the interconnector by press working into a shape in which the interconnector has a plurality of combinations of protrusions protruding in the first direction and recesses provided on a side opposite the protrusions in the first direction and being concave toward the protrusions; and an assembly step of combining the electrochemical reaction unit cell and the interconnector, wherein the press step forms the interconnector into a shape in which, in a section parallel to the first direction, the recess is located within the range of the width t2 of the protrusion in the second direction, and the width t1 of the recess in the second direction is smaller than the width t2 of the protrusion.

DESCRIPTION OF REFERENCE NUMERALS

Figure 1:
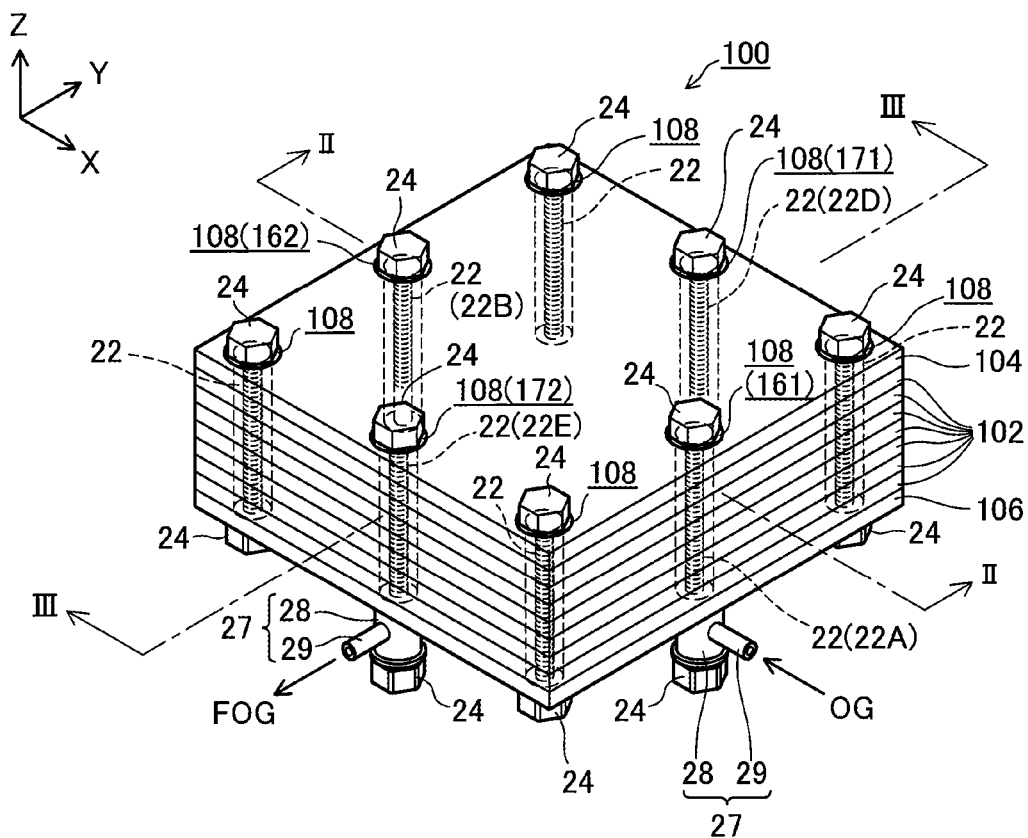
FIG. 1 is a perspective view showing the external appearance of a fuel cell stack 100 according to a first embodiment.

Reference numerals used to identify various features in the drawings include the following.

22: bolt, 24: nut; 26: insulation sheet; 27: gas passage member; 28: body portion; 29: branch portion; 100: fuel cell stack; 102: electricity generation unit; 104: end plate; 106: end plate; 107: interconnector-fuel cell unit cell composite body; 108: communication hole; 110: unit cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 136: coating; 138: bonding layer; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 152: cathode-side protrusion; 154: anode-side recess; 156: cathode-side recess; 158: anode-side protrusion; 161: oxidizer gas introduction manifold; 162: oxidizer gas discharge manifold; 166: cathode chamber; 171: fuel gas introduction manifold; 172: fuel gas discharge manifold; and 176: anode chamber.

DETAILED DESCRIPTION OF THE PREFERRED EMBODIMENTS

A. First Embodiment

A-1. Structure:
(Structure of Fuel Cell Stack 100)

Figure 2:
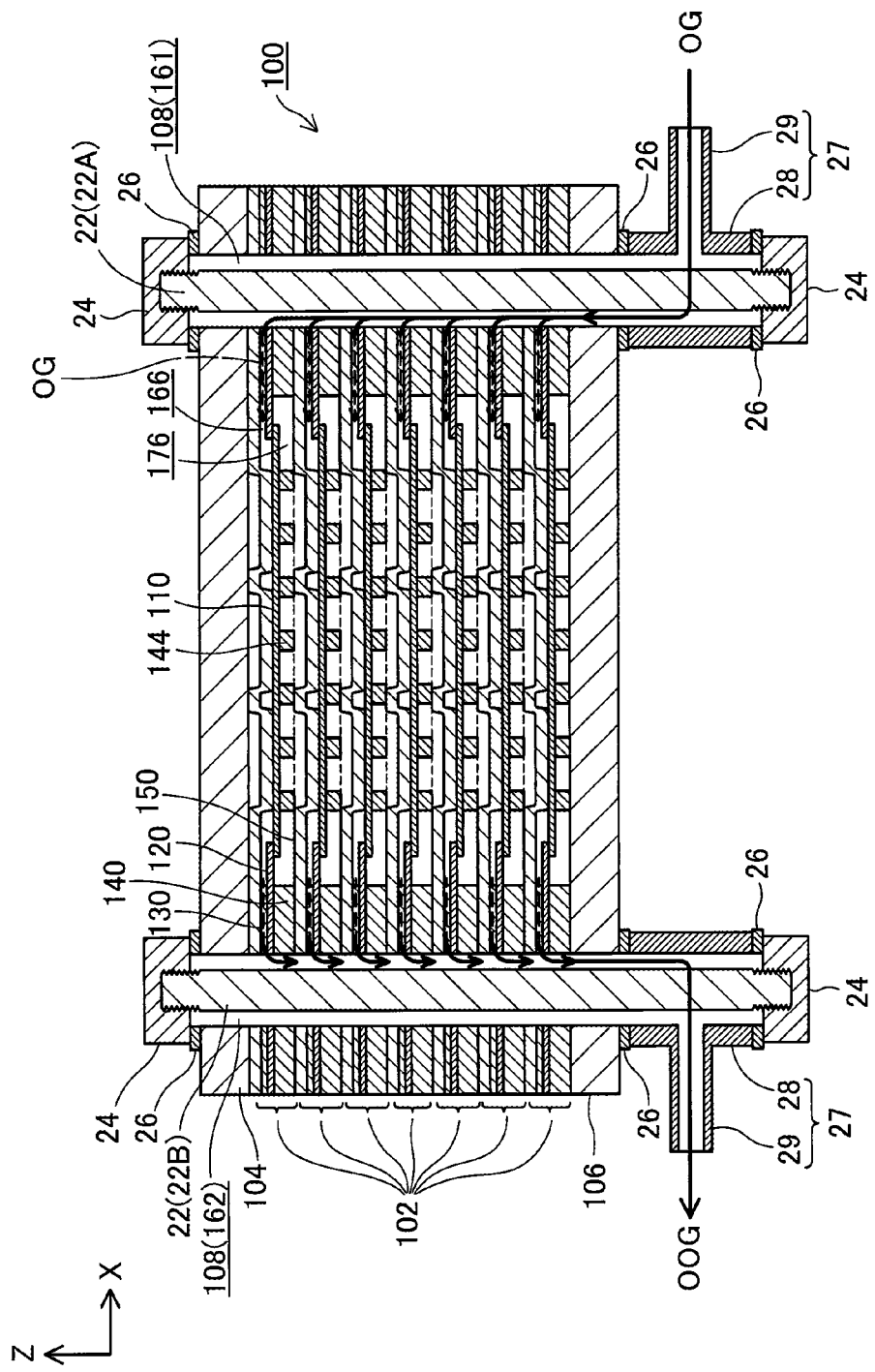
FIG. 2 is an explanatory view showing an XZ section of the fuel cell stack 100 taken along line II-II of FIG. 1.
Figure 3:
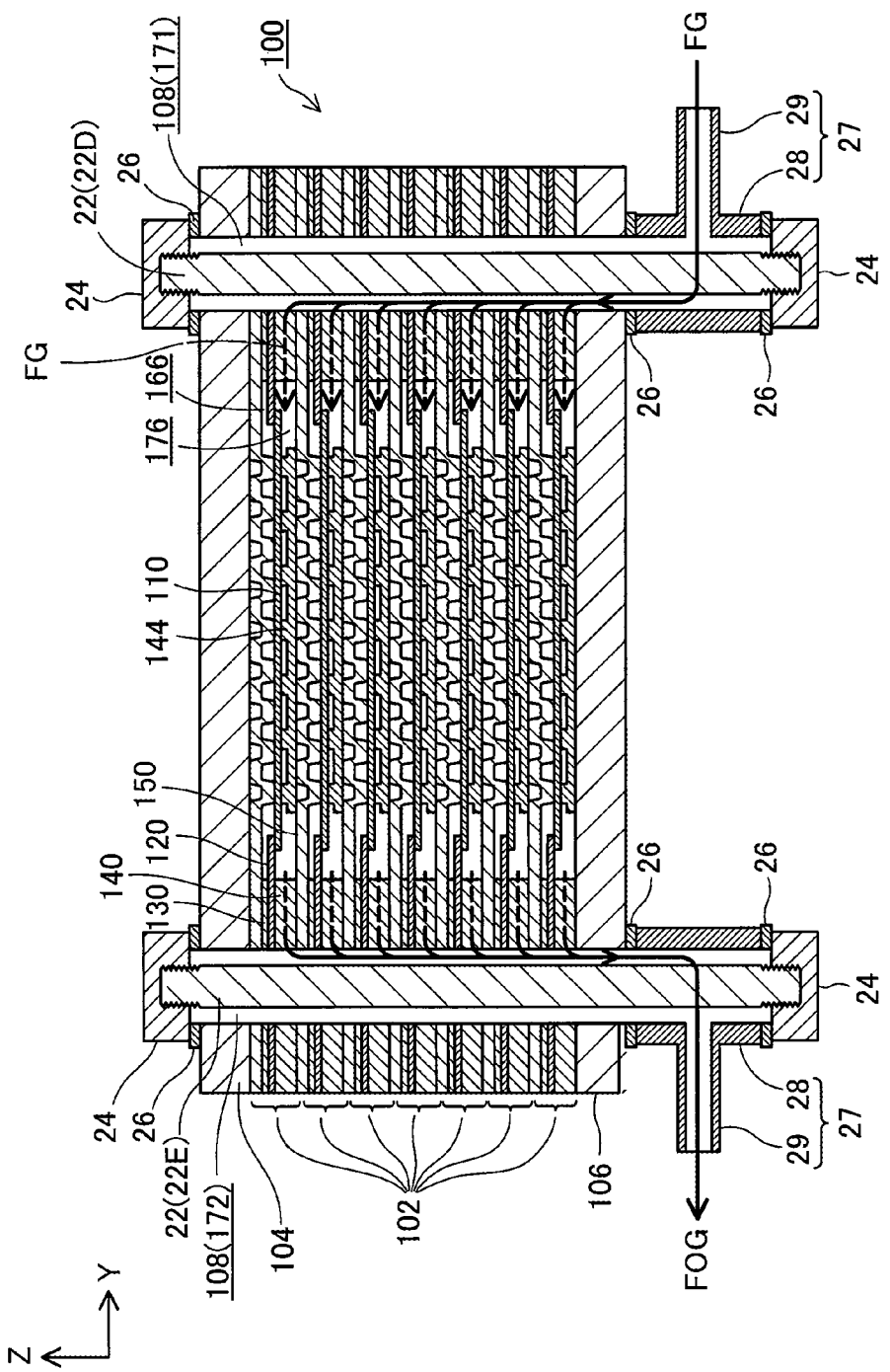
FIG. 3 is an explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying directions. In the present specification, for the sake of convenience, the positive Z-axis direction is called the upward direction and the negative Z-axis direction is called the downward direction; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined array direction (in the vertical direction in the present embodiment). A pair of the end plates 104 and 106 are disposed so as to hold an assembly of the seven electricity generation units 102 from the upper and lower sides thereof. The array direction (vertical direction) corresponds to the first direction appearing in the claims appended hereto. Also, the fuel cell stack 100 is an example of an electrochemical reaction cell stack.

The fuel cell stack 100 has a plurality (eight in the present embodiment) of holes formed therein and extending in the vertical direction through peripheral portions about the Z-axis direction of its component layers (the electricity generation units 102 and the end plates 104 and 106), and the corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 are called "communication holes 108."

Bolts 22 extending in the vertical direction are inserted into the corresponding communication holes 108, and the fuel cell stack 100 is clamped by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, described below, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side on the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102. A space defined by the bolt 22 (bolt 22B) located at around the midpoint of the other side opposite the above side (a side on the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side on the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102. A space defined by the bolt 22 (bolt 22E) located at around the midpoint of the other side opposite the above side (a side on the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
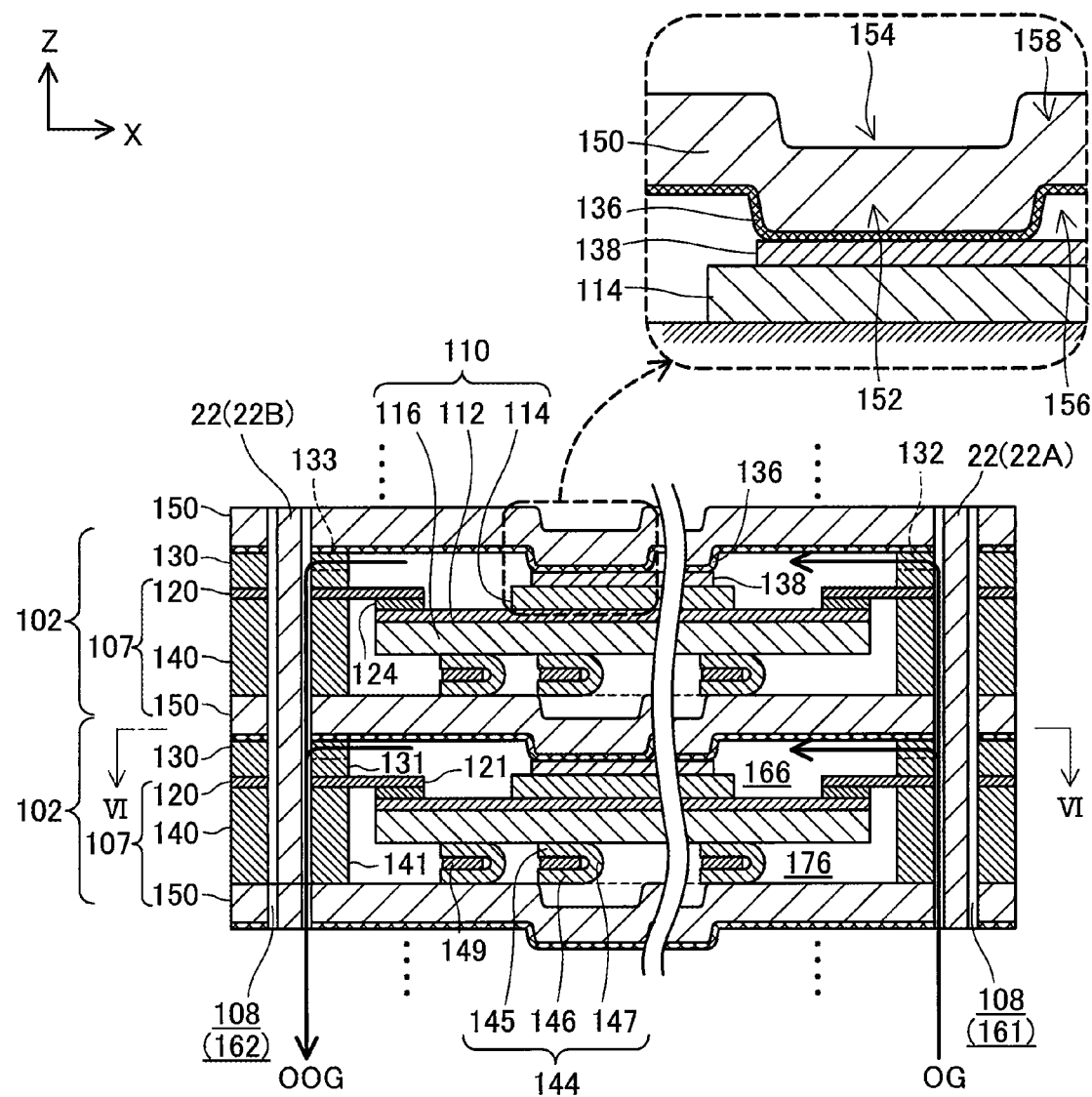
FIG. 4 is an explanatory view of the same XZ section as that of FIG. 2, showing two adjacent electricity generation units 102.
Figure 5:
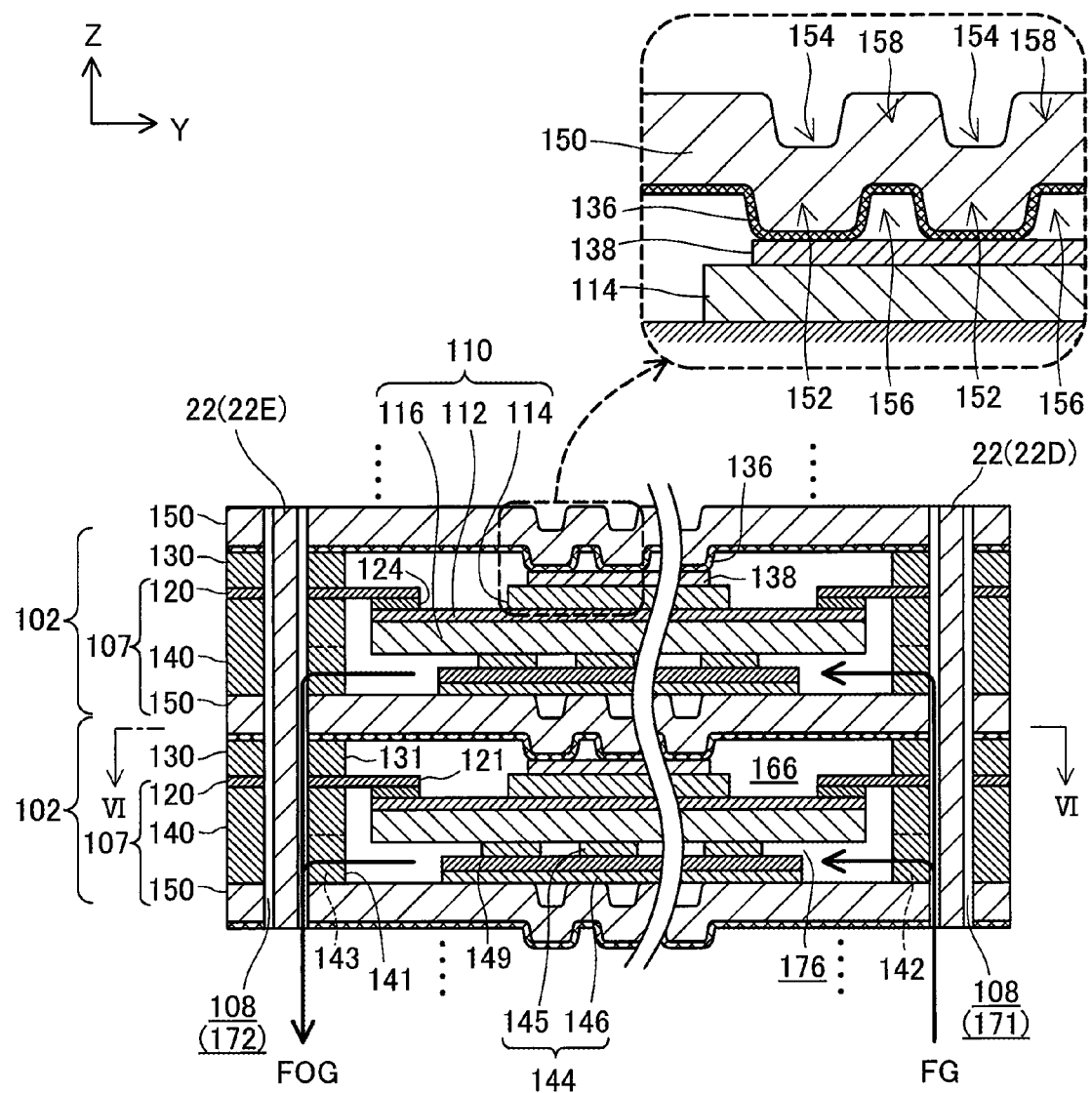
FIG. 5 is an explanatory view of the same YZ section as that of FIG. 3, showing two adjacent electricity generation units 102.
Figure 6:
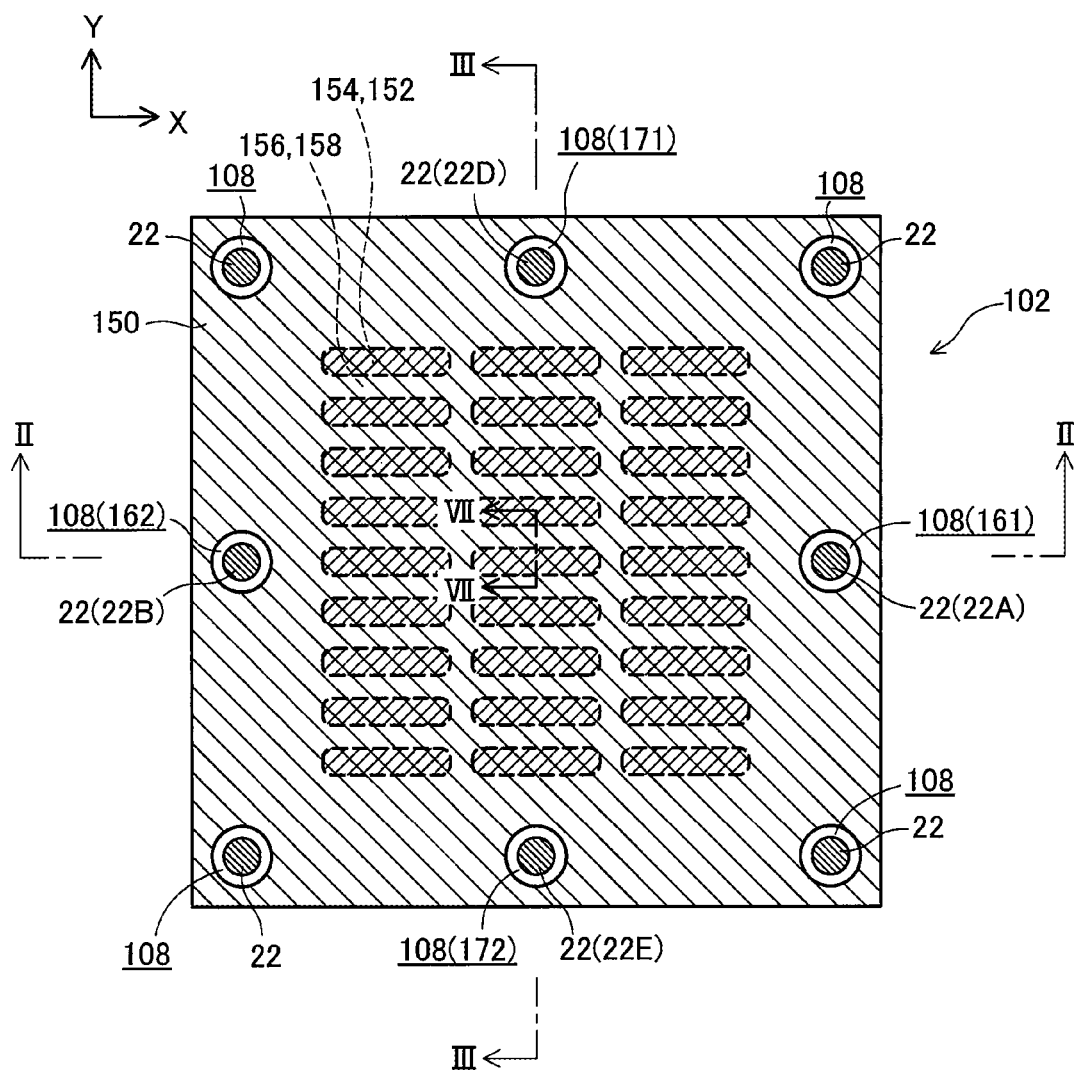
FIG. 6 is an explanatory view showing an XY section of an electricity generation unit 102 taken along line VI-VI of FIG. 4.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102. FIG. 6 is an explanatory view showing an XY section of the electricity generation unit 102 taken along line VI-VI of FIG. 4.

As shown in FIGS. 4 and 5, the electricity generation unit 102 serving as the smallest unit of electricity generation includes a unit cell 110, a separator 120, a cathode-side frame 130, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

Each interconnector 150 is an electrically conductive member having an approximately rectangular outer shape and is formed of a Cr (chromium)-containing metal (e.g., ferritic stainless steel). The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the end plate 106, the lowermost electricity generation unit 102 of the fuel cell stack 100 does not have the lower interconnector 150 (see FIGS. 2 and 3).

As shown in FIGS. 4 to 6, a plurality of combinations of protrusions 152 (hereinafter called "cathode-side protrusions 152") and recesses 154 (hereinafter called "anode-side recesses 154") are formed on each interconnector 150. The cathode-side protrusions 152 protrude downward from the interconnector 150. The anode-side recesses 154 are provided above the cathode-side protrusions 152 and are concave toward the cathode-side protrusions 152. Also, a recess 156 (hereinafter called "cathode-side recess 156") is formed between adjacent two cathode-side protrusions 152, and a protrusion 158 (hereinafter called "anode-side protrusion 158") is formed between adjacent two anode-side recesses 154. Namely, the interconnector 150 also has a plurality of combinations of the anode-side protrusions 158 projecting upward and the cathode-side recesses 156 which are provided below the anode-side protrusions 158 and are concave toward the anode-side protrusions 158.

Each of the cathode-side protrusions 152 formed on the upper-side interconnector 150 of a given electricity generation unit 102 are in direct contact or indirect contact with the surface of the cathode 114 of that electricity generation unit 102, which surface is located opposite the electrolyte layer 112. Also, each of the anode-side protrusions 158 of the interconnector 150 are in direct contact or indirect contact with the anode-side current collector 144 of another electricity generation unit 102 which is located adjacent to and on the upper side of the given electricity generation unit 102. Therefore, electrical communication between the electricity generation units 102 is secured by the interconnector 150. Also, the cathode-side recesses 156 formed on the upper-side interconnector 150 in the given electricity generation unit 102 partially define the cathode chamber 166 which faces the cathode 114 of the electricity generation unit 102.

Notably, in the present embodiment, each interconnector 150 is manufactured by performing press working on a metallic material having a flat-plate shape such that a plurality of combinations of the cathode-side protrusions 152 and the anode-side recesses 154 and a plurality of combinations of the anode-side protrusions 158 and the cathode-side recesses 156 are formed on the interconnector 150. More specifically, the space between adjacent two cathode-side protrusions 152 formed as a result of press working serves as a cathode-side recess 156, and the space between adjacent two anode-side recesses 154 formed as a result of press working serves as an anode-side protrusion 158. Since the protrusions and the recesses of each interconnector 150 are formed by press working, the efficiency of the manufacturing process can be increased as compared with the case where other methods such as etching are used. A more specific structure of the interconnector 150 will be described below.

The unit cell 110 includes an electrolyte layer 112, and a cathode 114 and an anode 116 which face each other in the vertical direction (direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having an approximately rectangular flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having an approximately rectangular flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having an approximately rectangular flat-plate shape and is formed of, for example, Ni (nickel), a cermet of Ni and ceramic powder, or an Ni-based alloy. Thus, the unit cell 110 (electricity generation unit 102) of the present embodiment is a solid oxide fuel cell (SOFC) which uses a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (unit cell 110) by means of a bonding member 124 formed of a brazing material (e.g., Ag brazing material) and disposed between the facing portion and the electrolyte layer 112. The separator 120 separates the cathode chamber 166 which faces the cathode 114, and the anode chamber 176 which faces the anode 116, from each other, thereby preventing gas leakage from one electrode side to the other electrode side through a peripheral portion of the unit cell 110. The unit cell 110 to which the separator 120 is bonded is also called a "separator-attached unit cell."

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface on a side opposite the electrolyte layer 112 of the separator 120 and with a peripheral portion of the surface on a side toward the cathode 114 of the interconnector 150. The cathode-side frame 130 electrically insulates the two interconnectors 150 contained in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface on a side toward the electrolyte layer 112 of the separator 120 and with a peripheral portion of the surface on a side toward the anode 116 of the interconnector 150. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface on a side opposite the electrolyte layer 112 of the anode 116, and the interconnector facing portion 146 is in contact with the surface on a side toward the anode 116 of the interconnector 150. However, as described above, since the electricity generation unit 102 disposed at the lowermost position in the fuel cell stack 100 does not have a lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. As a result, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150 (or the end plate 106).

As shown in FIGS. 4 and 5, the surface of each interconnector 150 on the side toward the cathode 114 is covered with an electrically conductive coating 136. The coating 136 is formed of, for example, a spinel oxide (e.g., $MnCo_2O_4$, $ZnMn_2O_4$, $CuMn_2O_4$). The formation of the coating 136 on the surface of the interconnector 150 is performed by a well-known method (e.g., spray coating, inkjet printing, spin coating, dip coating, plating, sputtering, or thermal spraying). Since the coating 136 is present, it is possible to prevent the occurrence of a phenomenon called "Cr diffusion" in which Cr diffuses from the surface of the interconnector 150. As a result, it is possible to prevent anomalous oxidization of the interconnector 150 due to deficiency of Cr and prevent the occurrence of a phenomenon called "Cr poisoning of the anode" in which the diffused Cr adheres to the surface of the cathode 114 and the electrode reaction speed at the cathode 114 decreases. Notably, in some case, a film of chromium oxide may be formed as a result of heat treatment of the interconnector 150. In such a case, the coating 136 is not the film and is a layer formed to cover the interconnector 150 having the film formed thereon. In the following description, the interconnector 150 refers to the "interconnector 150 covered with the coating 136," unless otherwise specified.

The cathode 114 and the interconnector 150 (more specifically, the cathode-side protrusions 152 of the interconnector 150) are bonded together by an electrically conductive bonding layer 138. The bonding layer 138 is formed of, for example, a spinel oxide (e.g., $Mn_{1.5}Co_{1.5}O_4$, $MnCo_2O_4$, $ZnCo_2O_4$, $ZnMn_2O_4$, $ZnMnCoO_4$, or $CuMn_2O_4$). The bonding layer 138 electrically connects the cathode 114 and the interconnector 150. In the previous description, the interconnector 150 is said to be in contact with the surface of the cathode 114; however, in the present embodiment, the bonding layer 138 intervenes between the cathode 114 and the interconnector 150 covered with the coating 136.

In the present specification, as shown in FIGS. 4 and 5, the structure of each electricity generation unit 102 from which the cathode-side frame 130 and the interconnector 150 on the cathode-side frame 130 side; i.e., a structure which includes the unit cell 110, the separator 120, the anode-side frame 140, and the interconnector 150 on the anode-side frame 140 side, is also referred to as an interconnector-fuel cell unit cell composite body 107. Although the fuel cell stack 100 includes a plurality of electricity generation units 102 arranged in the vertical direction as described above, the fuel cell stack 100 can be said to include a plurality of interconnector-fuel cell unit cell composite bodies 107 disposed with the cathode-side frame 130 intervening therebetween. The interconnector-fuel cell unit cell composite body 107 is an example of the interconnector-electrochemical reaction unit cell composite body.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the bonding layer 138, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 7:
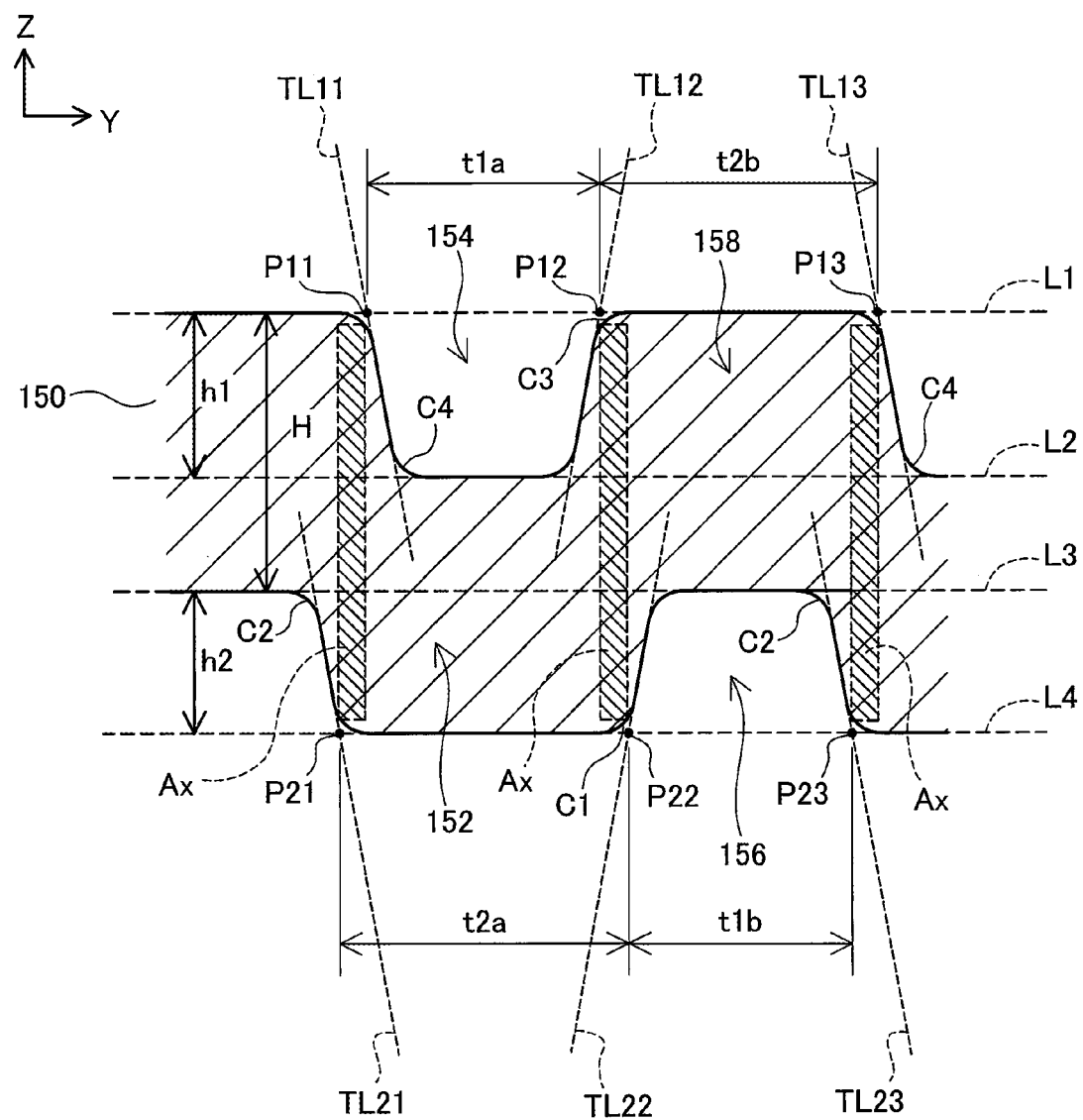
FIG. 7 is an explanatory view showing the specific structure of an interconnector 150.

A-3. Specific Structure of Interconnector 150:

FIG. 7 is an explanatory view showing the specific structure of each interconnector 150. FIG. 7 shows a YZ section of an interconnector 150 taken along line VII-VII of FIG. 6; i.e., a section of the interconnector 150 which is parallel to the vertical direction (the Z-axis direction) and the horizontal direction (the Y-axis direction) and which passes through the center of a cathode-side protrusion 152 in the X-axis direction.

FIG. 7 also shows a first imaginary straight line L1 which represents the vertical position of the open end of each anode-side recess 154, a second imaginary straight line L2 which represents the vertical position of the bottom of each anode-side recess 154, a third imaginary straight line L3 which represents the vertical position of the proximal end of each cathode-side protrusion 152, and a fourth imaginary straight line L4 which represents the vertical position of the distal end of each cathode-side protrusion 152. Notably, in the present embodiment, the vertical position of the distal end of each anode-side protrusion 158 is the same as the vertical position of the open end of each anode-side recess 154; the vertical position of the proximal end of each anode-side protrusion 158 is the same as the vertical position of the bottom of each anode-side recess 154; the vertical position of the bottom of each cathode-side recess 156 is the same as the vertical position of the proximal end of each cathode-side protrusion 152; and the vertical position of the open end of each cathode-side recess 156 is the same as the vertical position of the distal end of each cathode-side protrusion 152. Namely, the first imaginary straight line L1 also serves as an imaginary straight line which represents the position of the distal end of each anode-side protrusion 158; the second imaginary straight line L2 also serves as an imaginary straight line which represents the position of the proximal end of each anode-side protrusion 158; the third imaginary straight line L3 also serves as an imaginary straight line which represents the position of the bottom of each cathode-side recess 156, and the fourth imaginary straight line L4 also serves as an imaginary straight line which represents the position of the open end of each cathode-side recess 156.

FIG. 7 also shows the definition of the widths of each protrusion and each recess in the horizontal direction (the Y-axis direction). Namely, the width t2a of each cathode-side protrusion 152 is the distance between the point of intersection P21 between the fourth imaginary straight line L4 and an imaginary straight line TL21 formed by extending one side surface of the cathode-side protrusion 152 and the point of intersection P22 between the fourth imaginary straight line L4 and an imaginary straight line TL22 formed by extending the other side surface of the cathode-side protrusion 152. The width t1a of each anode-side recess 154 is the distance between the mutually facing inner wall surfaces of the interconnector 150 which define the anode-side recess 154; specifically, the distance between the point of intersection P11 between the first imaginary straight line L1 and an imaginary straight line TL11 obtained by extending one side surface of the anode-side recess 154 and the point of intersection P12 between the first imaginary straight line L1 and an imaginary straight line TL12 obtained by extending the other side surface of the anode-side recess 154. Similarly, the width t2b of each anode-side protrusion 158 is the distance between the point of intersection P12 (the same point as the above-mentioned point of intersection P12) between the first imaginary straight line L1 and the imaginary straight line TL12 obtained by extending one side surface of the anode-side protrusion 158 and the point of intersection P13 between the first imaginary straight line L1 and an imaginary straight line TL13 obtained by extending the other side surface of the anode-side protrusion 158. Also, the width t1b of each cathode-side recess 156 is the distance between the mutually facing inner wall surfaces of the interconnector 150 which define the cathode-side recess 156; specifically, the distance between the point of intersection P22 (the same point as the above-mentioned point of intersection P22) between the fourth imaginary straight line L4 and an imaginary straight line TL22 obtained by extending one side surface of the cathode-side recess 156 and the point of intersection P23 between the fourth imaginary straight line L4 and an imaginary straight line TL23 obtained by extending the other side surface of the cathode-side recess 156. Notably, the horizontal direction (the Y-axis direction) corresponds to the second direction appearing in the claims appended hereto.

As shown in FIG. 7, in each interconnector 150 of the present embodiment, a combination of a cathode-side protrusion 152 and an anode-side recess 154 arranged in the vertical direction is such that the bottom of the anode-side recess 154 (the position of the second imaginary straight line L2) is located on the side toward the open end of the anode-side recess 154 (the upper side) with respect to the proximal end of the cathode-side protrusion 152 (the position of the third imaginary straight line L3). Namely, the interconnector 150 has a region (a region between the second imaginary straight line L2 and the third imaginary straight line L3) in which neither the cathode-side protrusions 152 nor the anode-side recesses 154 are formed when viewed in the vertical direction. Notably, in the present embodiment, the above-described configuration is applied not only to the combination of the cathode-side protrusion 152 and the anode-side recess 154 shown in FIG. 7 but also to the remaining combinations of the cathode-side protrusions 152 and the anode-side recesses 154 formed on the interconnector 150.

Also, in the interconnector 150 of the present embodiment, the combination of an anode-side protrusion 158 and a cathode-side recess 156 arranged in the vertical direction is such that the bottom of the cathode-side recess 156 (the position of the third imaginary straight line L3) is located on the side toward the open end of the cathode-side recess 156 (the lower side) with respect to the proximal end of the anode-side protrusion 158 (the position of the second imaginary straight line L2). Namely, neither the anode-side protrusions 158 nor the cathode-side recesses 156 are formed in the region of the interconnector 150 between the second imaginary straight line L2 and the third imaginary straight line L3. Notably, in the present embodiment, the above-described configuration is applied not only to the combination of the cathode-side recess 156 and the anode-side protrusion 158 shown in FIG. 7, but also to the remaining combinations of the cathode-side recesses 156 and the anode-side protrusions 158 formed on the interconnector 150.

As described above, in the present embodiment, a partial region of each interconnector 150 in the vertical direction (the region between the second imaginary straight line L2 and the third imaginary straight line L3) has neither recesses nor protrusions, and constitutes a continuous flat-plate shaped portion which extends perpendicularly to the vertical direction. Therefore, the interconnector 150 of the present embodiment can be said to have a higher rigidity as compared with the case where the interconnector 150 does not have the above-mentioned flat-plate shaped portion.

Also, in each interconnector 150 of the present embodiment, in the section shown in FIG. 7, each anode-side recess 154 is located within the range of the width t2a of the corresponding cathode-side protrusion 152, and the width t1a of each anode-side recess 154 is smaller than the width t2a of each cathode-side protrusion 152. Therefore, each interconnector 150 has regions Ax each of which is encompassed within the width t2a of a cathode-side protrusion 152 and is not encompassed within the width t1a of an anode-side recess 154 corresponding to the cathode-side protrusion 152.

Notably, in the present embodiment, each interconnector 150 has the above-described configuration not only in the section in FIG. 7, but also in any section which is parallel to the vertical direction and passes through the center of the cathode-side protrusion 152. Also, in the present embodiment, the above-described configuration is applied not only to the combination of the cathode-side protrusion 152 and the anode-side recess 154 shown in FIG. 7, but also to the remaining combinations of the cathode-side protrusions 152 and the anode-side recesses 154 formed on the interconnector 150.

Similarly, in each interconnector 150 of the present embodiment, in the section shown in FIG. 7, each cathode-side recess 156 is located within the range of the width t2b of the corresponding anode-side protrusion 158, and the width t1b of each cathode-side recess 156 is smaller than the width t2b of each anode-side protrusion 158. Therefore, each interconnector 150 has regions Ax each of which is encompassed within the width t2b of an anode-side protrusion 158 and is not encompassed within the width t1b of a cathode-side recess 156 corresponding to the anode-side protrusion 158. Notably, in the present embodiment, each interconnector 150 has the above-described configuration not only in the section in FIG. 7, but also in any section which is parallel to the vertical direction and passes through the center of the anode-side protrusion 158. Also, in the present embodiment, the above-described configuration is applied not only to the combination of the cathode-side recess 156 and the anode-side protrusion 158 shown in FIG. 7, but also to the remaining combinations of the cathode-side recesses 156 and the anode-side protrusions 158 formed on the interconnector 150.

As described above, in each interconnector 150 of the present embodiment, in a section which is parallel to the vertical direction and the horizontal direction and which passes through the center of a cathode-side protrusion 152 (the section shown in FIG. 7), each combination of a recess (an anode-side recess 154 or a cathode-side recess 156) and a protrusion (a cathode-side protrusion 152 or an anode-side protrusion 158) is arranged such that the recess is located within the range of the width t2 of the protrusion, and the width t1 of the recess is smaller than the width t2 of the protrusion. Therefore, as compared with a configuration in which the width of the recess is equal to or greater than the width of the protrusion (a configuration in which the regions Ax shown in FIG. 7 are not present), the concentration of stress at corner portions of the protrusion and corner portions of the recess is mitigated, whereby generation of cracks or strain in the interconnectors 150 can be restrained. This point will be described in detail below.

Also, in each interconnector 150 of the present embodiment, the bottom-side corners C4 of each anode-side recess 154 are radiused, and the bottom-side corners C2 of each cathode-side recess 156 are radiused. Therefore, the concentration of stress at the corners of each recess of the interconnector 150 is effectively mitigated, whereby the generation of cracks or strain in the interconnectors 150 can be prevented effectively. Notably, from the viewpoint of mitigation of stress concentration, the curvature radius R4 of the bottom-side corners C4 of each anode-side recess 154 and the curvature radius R2 of the bottom-side corners C2 of each cathode-side recess 156 are preferably 0.05 mm or greater, and more preferably, 0.25 mm or greater.

Also, in each interconnector 150 of the present embodiment, the proximal-end-side corners C2 and distal-end-side corners C1 of each cathode-side protrusion 152 are radiused, and the proximal-end-side corners C4 and distal-end-side corners C3 of each anode-side protrusion 158 are radiused. Therefore, as compared with a configuration in which the corners of each protrusion of the interconnector 150 are not radiused, a decrease in the thickness of the coating 136 at the corners of each protrusion can be restrained, whereby Cr diffusion from the corners of each protrusion can be restrained effectively. Notably, in the present embodiment, the proximal-end-side corners C2 of a certain cathode-side protrusion 152 are the same as the bottom-side corners C2 of the cathode-side recesses 156 located adjacent to the given cathode-side protrusion 152. Also, the proximal-end-side corners C4 of a given anode-side protrusion 158 are the same as the bottom-side corners C4 of the anode-side recesses 154 located adjacent to the certain anode-side protrusion 158.

Figure 8:
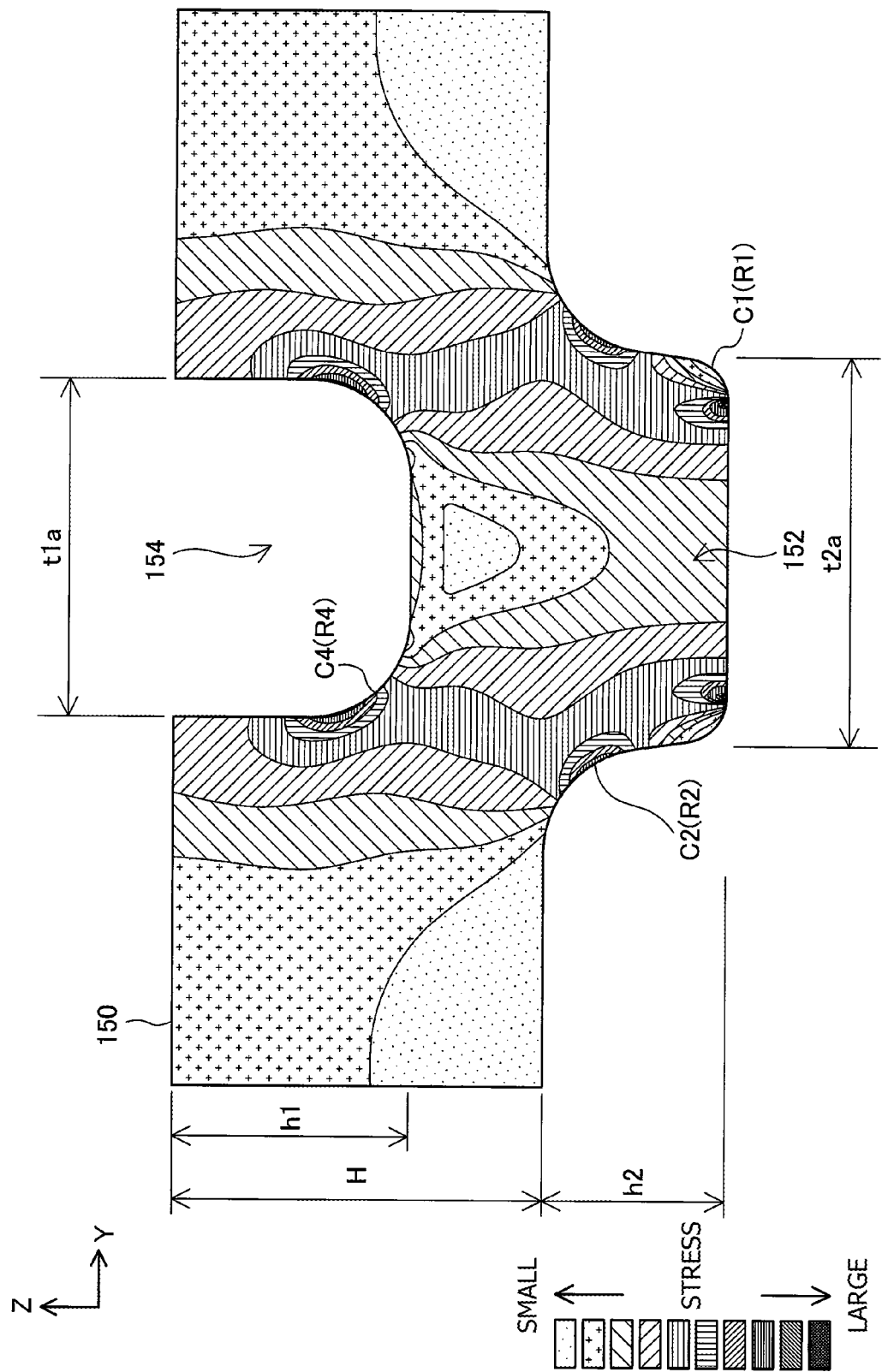
FIG. 8 is an explanatory diagram showing the distribution of equivalent stress in an interconnector 150 of Example 1.
Figure 9:
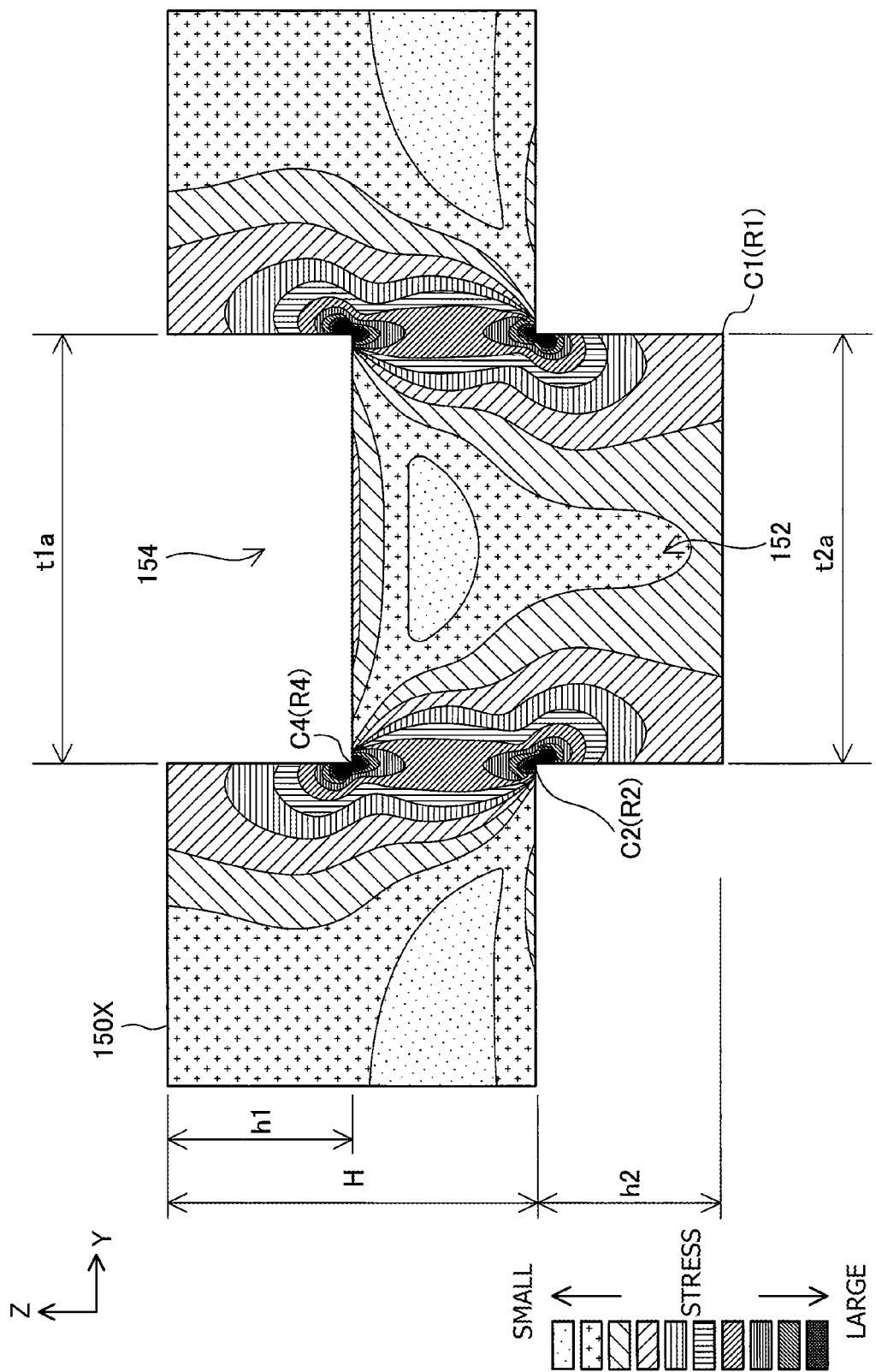
FIG. 9 is an explanatory diagram showing the distribution of equivalent stress in an interconnector 150X of Comparative Example.
Figure 10:
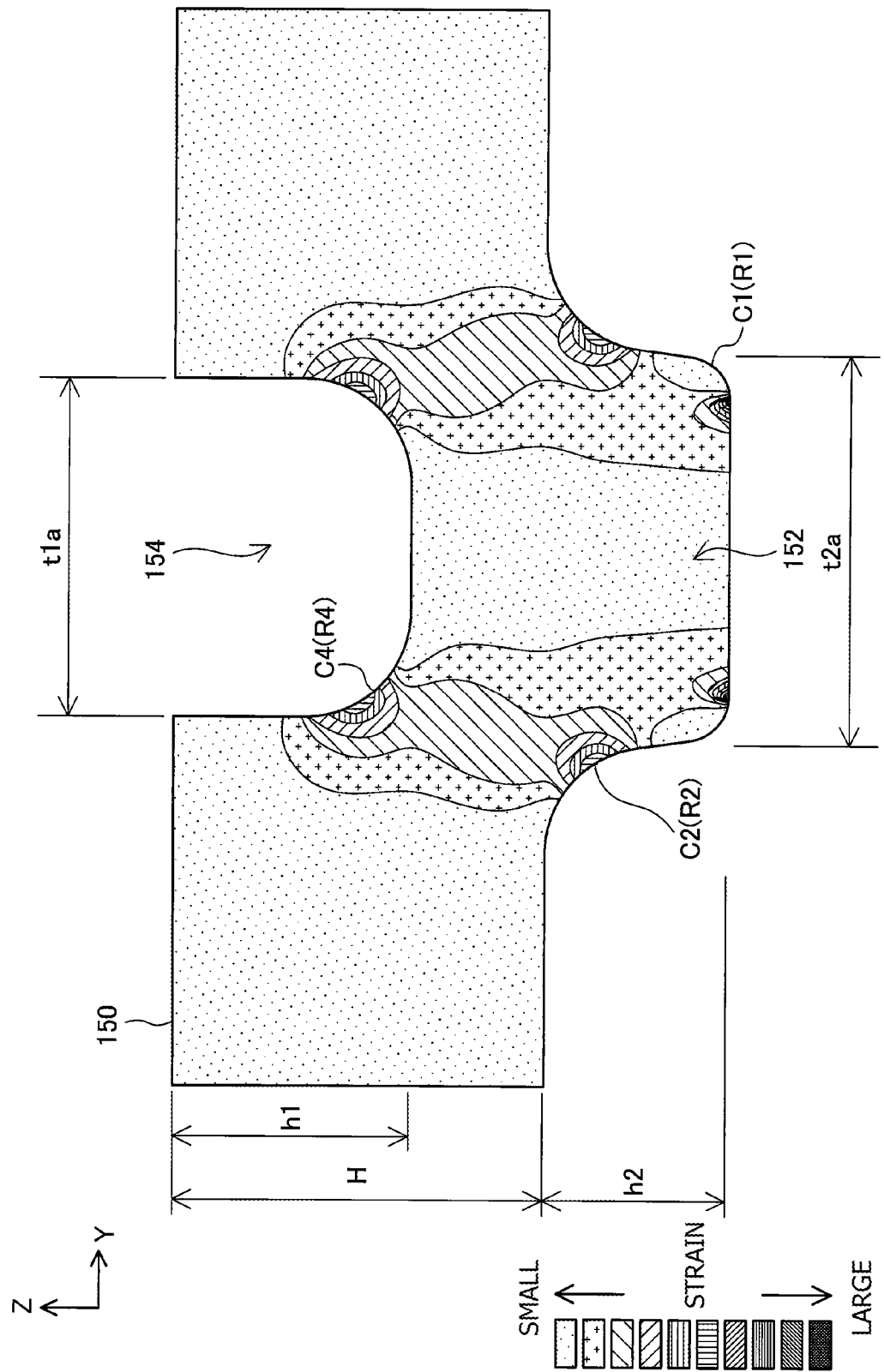
FIG. 10 is an explanatory diagram showing the distribution of equivalent creep strain in an interconnector 150 of Example 1.
Figure 11:
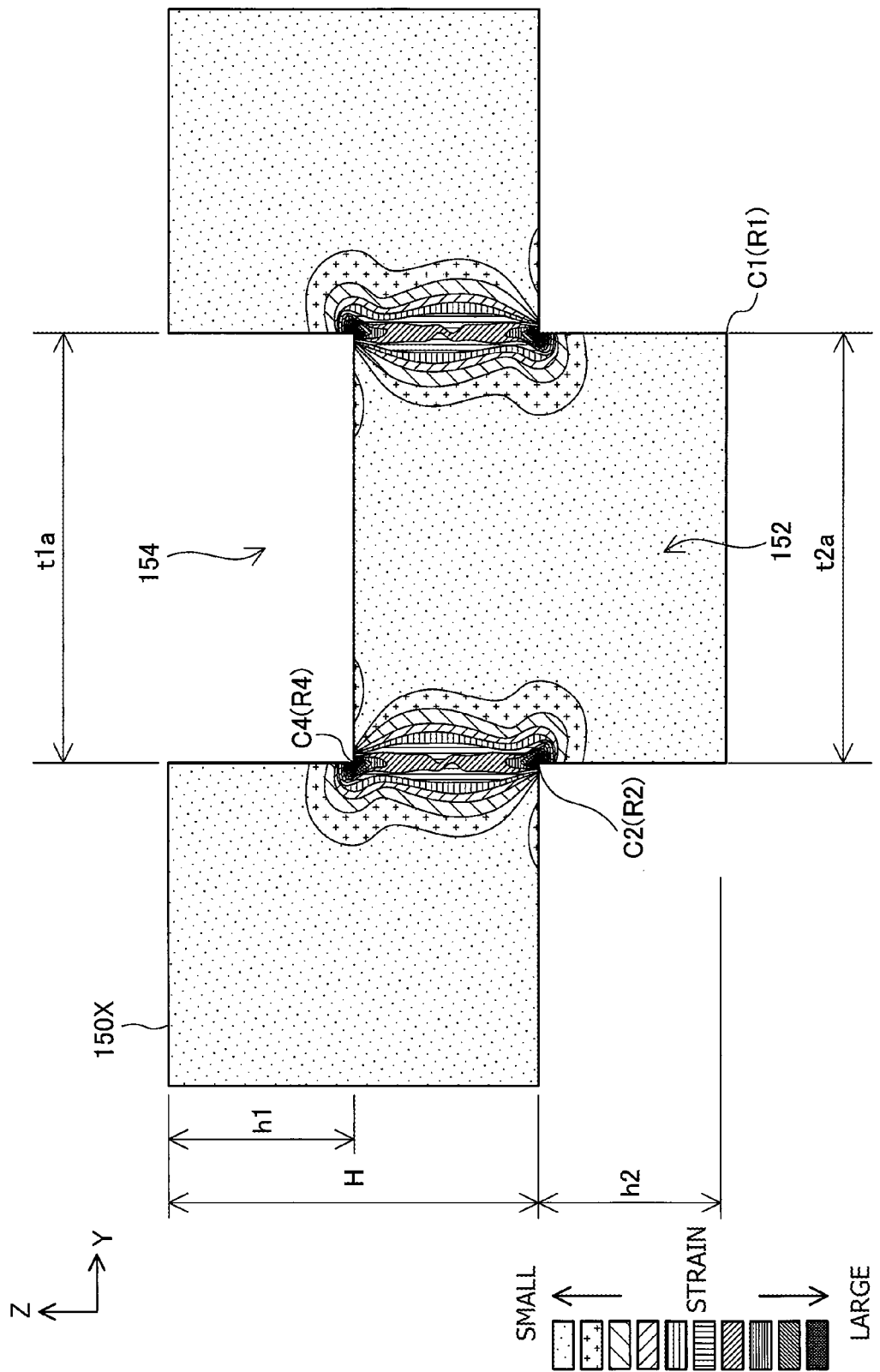
FIG. 11 is an explanatory diagram showing the distribution of equivalent creep strain in an interconnector 150X of Comparative Example.

A-4. Evaluation of Performance of Interconnectors 150:

The performance of the interconnectors 150 of the present embodiment having the above-described structure has been evaluated through simulation. FIGS. 8 through 11 are explanatory diagrams showing examples of simulation results. In the simulation, for the case where the clamping load of a fuel cell stack 100 was set to 47.5 N and power generation was performed at 700° C., the equivalent stress produced in each interconnector 150 at the beginning of the power generation and the equivalent creep strain of each interconnector 150 after power generation for 120,000 hours was calculated. For the simulation, a fuel cell stack 100 was used including interconnectors 150 of Example 1 and a fuel cell stack 100 including interconnectors 150X of a Comparative Example. FIG. 8 shows the distribution of equivalent stress in one of the interconnectors 150 of Example 1. FIG. 9 shows the distribution of equivalent stress in one of the interconnectors 150X of the Comparative Example. FIG. 10 shows the distribution of equivalent creep strain in one of the interconnectors 150 of Example 1. FIG. 11 shows the distribution of equivalent creep strain in one of the interconnectors 150X of Comparative Example. Relevant portions of the interconnectors 150 of Example 1 and the interconnectors 150X of the Comparative Example have the following dimensions.

(1) The Interconnectors 150 of Example 1
  The width t1a of each anode-side recess 154: 0.8 mm
  The width t2a of each cathode-side protrusion 152: 1.000 mm
  The depth h1 of each anode-side recess 154: 0.515 mm
  The height h2 of each cathode-side protrusion 152: 0.4 mm
  The reference height H of each interconnector 150: 0.8 mm
  The curvature radius R1 of the distal-end-side corners C1 of each cathode-side protrusion 152: 0.1 mm
  The curvature radius R2 of the proximal-end-side corners C2 of each cathode-side protrusion 152: 0.25 mm
  The curvature radius R4 of the bottom-side corners C4 of each anode-side recess 154: 0.25 mm (2) The Interconnectors 150X of Comparative Example
  The width t1a of each anode-side recess 154: 1.000 mm
  The width t2a of each cathode-side protrusion 152: 1.000 mm
  The depth h1 of each anode-side recess 154: 0.4 mm
  The height h2 of each cathode-side protrusion 152: 0.4 mm
  The reference height H of each interconnector 150: 0.8 mm
  The curvature radius R1 of the distal-end-side corners C1 of each cathode-side protrusion 152:—(right-angle shape)
  The curvature radius R2 of the proximal-end-side corners C2 of each cathode-side protrusion 152:—(right-angle shape)
  The curvature radius R4 of the bottom-side corners C4 of each anode-side recess 154:—(right-angle shape)

Notably, as shown in FIG. 7, the depth h1 of each anode-side recess 154 is the depth of each anode-side recess 154 in the vertical direction (the distance between the first imaginary straight line L1 and the second imaginary straight line L2); the height h2 of each cathode-side protrusion 152 is the height of each cathode-side protrusion 152 in the vertical direction (the distance between the third imaginary straight line L3 and the fourth imaginary straight line L4); and the reference height H of each interconnector 150 is the height of each interconnector 150 in the vertical direction with portions corresponding to the cathode-side protrusions 152 removed and is the distance in the vertical direction between the open end of each anode-side recess 154 (the first imaginary straight line L1) and the proximal end of 152 (the third imaginary straight line L3). As described above, in the present embodiment, when each interconnector 150 is manufactured, press working is performed on a metallic material having a flat-plate shape to thereby form a plurality of combinations of cathode-side protrusions 152 and anode-side recesses 154 such that the space between adjacent two cathode-side protrusions 152 formed as a result of the press working serves as a cathode-side recess 156, and the space between adjacent two anode-side recesses 154 formed as a result of the press working serves as an anode-side protrusion 158. Therefore, the reference height H of each interconnector 150 corresponds to the thickness of the metallic material.

As described above, the interconnectors 150X of the Comparative Example differ in the width t1a of each anode-side recess 154 from the interconnectors 150 of Example 1. Specifically, in the interconnectors 150X of Comparative Example, the width t1a of each anode-side recess 154 is equal to the width t2a of each cathode-side protrusion 152 (see FIGS. 9 and 11). Therefore, the interconnectors 150X of the Comparative Example do not have the above-mentioned regions Ax (see FIG. 7), each of which is encompassed within the width t2a of a cathode-side protrusion 152 and is not encompassed within the width t1a of an anode-side recess 154 corresponding to the cathode-side protrusion 152. Also, in the interconnectors 150X of Comparative Example, the distal-end-side corners C1 of each cathode-side protrusion 152, the proximal-end-side corners C2 of each cathode-side protrusion 152, and the bottom-side corners C4 of each anode-side recess 154 are not radiused and each has a right-angle shape.

As shown in FIG. 9, in the interconnector 150X of Comparative Example, stress concentrates locally. In particular, the stresses produced at the proximal-end-side corners C2 of each cathode-side protrusion 152 and at the bottom-side corners C4 of each anode-side recess 154 are very large. In contrast, as shown in FIG. 8, in the interconnector 150 of Example 1, stress concentration is mitigated. In the interconnector 150 of Example 1, the maximum stress is produced in the vicinity of the distal end of the cathode-side protrusion 152; however, its value was equal to or less than a half of the value of the maximum stress produced in the interconnector 150X of the Comparative Example (produced at the proximal-end-side corners C2 of the cathode-side protrusion 152). Conceivably, the reason why stress concentration is mitigated in the interconnector 150 of Example 1 is that the interconnector 150 has the above-mentioned regions Ax, each of which is encompassed within the width t2a of a cathode-side protrusion 152 and is not encompassed within the width t1a of an anode-side recess 154 corresponding to the cathode-side protrusion 152. Consequently, the positions of the proximal-end-side corners C2 of the cathode-side protrusion 152 in the Y-axis direction (the horizontal direction) deviate from the positions of the bottom-side corners C4 of the anode-side recess 154. Further, conceivably, such a stress concentration mitigation effect is enhanced by the radiused shapes of the bottom-side corners C4 of the anode-side recess 154 and the proximal-end-side corners C2 of the cathode-side protrusion 152.

Also, as shown in FIG. 11, in the interconnector 150X of the Comparative Example, creep strain is very large, in particular, at the proximal-end-side corners C2 of the cathode-side protrusion 152 and at the bottom-side corners C4 of the anode-side recess 154. In contrast, as shown in FIG. 10, in the interconnector 150 of Example 1, creep strain is smaller. In the interconnector 150 of Example 1, the maximum creep strain is produced in the vicinity of the distal end of the cathode-side protrusion 152; however, its value was equal to or less than a half of the maximum value of creep strain produced in the interconnector 150X of the Comparative Example (produced at the proximal-end-side corners C2 of the cathode-side protrusion 152). Conceivably, the reason why creep strain is smaller in the interconnector 150 of Example 1 as described above is the same as the reason why the above-described stress decreases.

Explanatory Table 1 below shows another example of simulation results. Table 1 shows the dimensions of relevant portions and the maximum values of equivalent stress in the interconnectors 150 of other examples (Examples 2 to 5) as well as the above-described Example 1 and the Comparative Example. Nos. 1 to 5 in Table 1 correspond to Examples 1 to 5, and No. 6 in Table 1 corresponds to the Comparative Example. The examples differ in terms of the width t1a of each anode-side recess 154 and the depth h1 of each anode-side recess 154. In the present simulation, each interconnector 150 is assumed to be manufactured by press working. Therefore, in order to form each cathode-side protrusion 152 into a predetermined shape, the depth h1 and width t1a of each anode-side recess 154 are set such that the smaller (shallower) the depth h1, the larger the width t1a. Notably, in all the examples, each anode-side recess 154 is located within the range of the width t2a of a cathode-side protrusion 152 corresponding thereto, and the width t1a of each anode-side recess 154 is smaller than the width t2a of each cathode-side protrusion 152.

As shown in Table 1, in Example 5 (namely, No. 5 in Table 1), the depth h1 of each anode-side recess 154 is large as compared with other examples, and accordingly, the width t1a of each anode-side recess 154 is small. In this Example 5, the maximum value of equivalent stress is somewhat large as compared with other examples. Conceivably, this is because when the depth h1 of each anode-side recess 154 becomes excessively large, the shortest distance (thickness) between the cathode 114 side surface and the anode 116 side surface of the interconnector 150 decreases. From the results shown in Table 1, the ratio (h/H) of the depth h1 of each anode-side recess 154 to the reference height H of the interconnector 150 is preferably equal to or less than 0.69. Also, the ratio (t1a/t2a) of the width t1a of each anode-side recess 154 to the width t2a of each cathode-side protrusion 152 preferably falls within the range of 0.75 to 0.925.

Notably, in Example 2 (namely, No. 2 in Table 1), the width t1a of each anode-side recess 154 is smaller by only a small amount than the width t2a of each cathode-side protrusion 152; however, the depth h1 of each anode-side recess 154 is very small (shallow). Accordingly, the shortest distance (thickness) between the cathode 114 side surface and the anode 116 side surface of the interconnector 150 increases, and equivalent stress is restrained.

TABLE 1

| No. | t1a (mm) | t2a (mm) | (t1a/t2a) | h1 (mm) | h2 (mm) | H (mm) | (h1/H) | R4 (R2) (mm) | Stress (Max.) (MPa) |
|---|---|---|---|---|---|---|---|---|---|
| 2 | 0.925 | 1.000 | (0.925) | 0.450 | 0.400 | 0.800 | (0.563) | 0.250 | 6.47 |
| 3 | 0.825 | 1.000 | (0.825) | 0.500 | 0.400 | 0.800 | (0.625) | 0.250 | 6.51 |
| 1 | 0.800 | 1.000 | (0.800) | 0.515 | 0.400 | 0.800 | (0.644) | 0.250 | 6.44 |
| 4 | 0.750 | 1.000 | (0.750) | 0.550 | 0.400 | 0.800 | (0.688) | 0.250 | 6.51 |
| 5 | 0.690 | 1.000 | (0.690) | 0.600 | 0.400 | 0.800 | (0.750) | 0.250 | 6.79 |
| 6 | 1.000 | 1.000 | (1.000) | 0.400 | 0.400 | 0.800 | (0.500) | — | 13.8 |

B. Modifications

The techniques disclosed herein are not limited to the above embodiments, but may be modified into various other forms without departing from the gist thereof. For example, the technique may be modified as described below.

In the above embodiment, the cathode 114 side surface of each interconnector 150 is covered with the coating 136. However, instead of or in addition to the cathode 114 side surface, the anode 116 side surface of each interconnector 150 may be covered with a coating (for example, nickel coating). In such a configuration, when at least the proximal-end-side corners C4 or distal-end-side corners C3 of each anode-side protrusion 158 of each interconnector 150 is radiused, the thickness of the coating is prevented from decreasing at the corners of each anode-side protrusion 158, which is preferred. Alternatively, the embodiment may be modified such that none of the surfaces of each interconnector 150 is covered with a coating.

The materials used for forming the various members in the above-described embodiment are mere examples, and the members may be formed of other materials. For example, in the above-described embodiment, the interconnectors 150 are formed of a Cr-containing metal. However, the interconnectors 150 may be formed of any of other materials.

In the above-described embodiment, all the plurality of combinations of the cathode-side protrusions 152 and the anode-side recesses 154 and all the plurality of combinations of the cathode-side recesses 156 and the anode-side protrusions 158, which are formed on all the interconnectors 150 contained in the fuel cell stack 100, are configured such that the bottom of each anode-side recess 154 is located on the side toward the open end of the anode-side recess 154 with respect to the proximal end of the corresponding cathode-side protrusion 152. Further, the bottom of each cathode-side recess 156 is located on the side toward the open end of the cathode-side recess 156 with respect to the proximal end of the corresponding anode-side protrusion 158. However, it is sufficient that such a configuration is employed for at least one of the above-described combinations of at least one interconnector 150.

In the above-described embodiment, in any section which is parallel to the vertical direction and which passes through the center of a cathode-side protrusion 152, each anode-side recess 154 is located within the range of the width t2a of the corresponding cathode-side protrusion 152, the width t1a of each anode-side recess 154 is smaller than the width t2a of each cathode-side protrusion 152, each cathode-side recess 156 is located within the range of the width t2b of the corresponding anode-side protrusion 158, and the width t1b of each cathode-side recess 156 is smaller than the width t2b of each anode-side protrusion 158. However, it is sufficient that each interconnector 150 has such a structure in at least one section which is parallel to the vertical direction and which passes through the center of a cathode-side protrusion 152. Also, in the above-described embodiment, all the plurality of combinations of the cathode-side protrusions 152 and the anode-side recesses 154 and all the plurality of combinations of the cathode-side recesses 156 and the anode-side protrusions 158, which are formed on all the interconnectors 150 contained in the fuel cell stack 100, are configured as described above. However, it is sufficient that such a configuration is employed for at least one of the above-described combinations of at least one interconnector 150.

In the above-described embodiment, it is not essential that the corners of each protrusion and each recess have a radiused shape.

In the above embodiment, the number of the electricity generation units 102 contained in the fuel cell stack 100 is a mere example and is determined as appropriate in accordance with, for example, a required output voltage of the fuel cell stack 100. In the above embodiment, spaces between the outer circumferential surfaces of shaft portions of the bolts 22 and the inner circumferential surfaces of the communication holes 108 are utilized as manifolds. However, axial holes may be formed in the shaft portions of the bolts 22 for use as the manifolds. Also, the manifolds may be provided separately from the communication holes 108 into which the bolts 22 are inserted. In the above embodiment, the cathode-side frame 130 is formed of an insulator. However, the anode-side frame 140 rather than the cathode-side frame 130 may be formed of an insulator. Also, the cathode-side frame 130 and the anode-side frame 140 may have a multilayer structure. In the above embodiment, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the present specification, a structure in which "a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be a structure in which the cathode 114 and the anode 116 face each other with the electrolyte layer 112 intervening therebetween.

In the above embodiment, the fuel cell stack 100 has a structure in which a plurality of the flat electricity generation units 102 are stacked. However, the present invention can be similarly applied to other structures, for example, a structure in which a plurality of approximately cylindrical unit cells of a fuel cell are connected in series as described in Japanese Patent Application Laid-Open (kokai) No. 2008-59797.

The above embodiment refers to SOFC for generating electricity by utilizing the electrochemical reaction between hydrogen contained in fuel gas and oxygen contained in oxidizer gas; however, the present invention is also applicable to an interconnector-electrolysis cell composite body (another example of the interconnector-electrochemical reaction unit cell composite body) which includes an interconnector and an electrolysis cell unit which is the smallest unit of a solid oxide electrolysis cell (SOEC) for generating hydrogen by utilizing the electrolysis of water, and to an electrolysis cell stack (another example of the electrochemical reaction cell stack) having a plurality of interconnector-electrolysis cell composite bodies. Since the structure of the electrolysis cell stack is publicly known as described in, for example, Japanese Patent Application Laid-Open (kokai) No. 2014-207120, a detailed description thereof is omitted, but schematically, the electrolysis cell stack has a structure similar to that of the fuel cell stack 100 in the above embodiment. That is, the fuel cell stack 100 in the above embodiment is designated as an "electrolysis cell stack," and the electricity generation unit 102 is designated as an "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as a material gas through the communication hole 108. As a result, the electrolysis of water occurs in the electrolysis cell units, whereby hydrogen gas is generated in the anode chambers 176, and hydrogen is discharged to the outside of the electrolysis cell stack through the communication hole 108.

The above embodiment is described with reference to the solid oxide fuel cell (SOFC); however, the present invention is also applicable to other types of fuel cells (or electrolysis cells), such as a polymer electrolyte fuel cell (PEFC), a phosphoric-acid fuel cell (PAFC), and a molten carbonate fuel cell (MCFC).

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. An interconnector-electrochemical reaction unit cell composite body comprising:
    an electrochemical reaction unit cell including an electrolyte layer, and a cathode and an anode which face each other in a first direction with the electrolyte layer intervening therebetween; and
    an interconnector which is disposed on one side of the electrochemical reaction unit cell in the first direction,
    the interconnector-electrochemical reaction unit cell composite body being characterized in that
    the interconnector has a plurality of combinations of a protrusion protruding in the first direction and a recess provided on a side opposite the protrusion in the first direction and being concave toward the protrusion; and at least one of the plurality of combinations of the protrusion and the recess is configured such that, in a sectional view of the interconnector taken along the first direction, (i) a bottom of the recess is located on a side toward an open end of the recess with respect to a proximal end of the protrusion, (ii) the recess is located within a range of a width t2 of the protrusion in a second direction orthogonal to the first direction, and a width t1 of the recess in the second direction is smaller than the width t2 of the protrusion, (iii) a depth h of the recess in the first direction and a distance H in the first direction between the open end of the recess and the proximal end of the protrusion satisfy a relation of $0.563 \leq h/H \leq 0.750$.

2. The interconnector-electrochemical reaction unit cell composite body as claimed in claim 1, wherein bottom-side corners of the recess are curved.

3. The interconnector-electrochemical reaction unit cell composite body as claimed in claim 1, wherein at least proximal-end-side corners or distal-end-side corners of the protrusion are curved.

4. The interconnector-electrochemical reaction unit cell composite body as claimed in claim 1, wherein at least one of the plurality of combinations is configured such that a depth h of the recess in the first direction and a distance H in the first direction between the open end of the recess and the proximal end of the protrusion satisfy a relation of $h/H \leq 0.69$.

5. The interconnector-electrochemical reaction unit cell composite body as claimed in claim 1, wherein at least one of the plurality of combinations is configured such that, in the section parallel to the first direction, the width t1 of the recess and the width t2 of the protrusion satisfy a relation of $0.75 \leq t1/t2 \leq 0.925$.

6. The interconnector-electrochemical reaction unit cell composite body as claimed in claim 1, wherein the electrolyte layer contains a solid oxide.

7. An electrochemical reaction cell stack comprising a plurality of interconnector-electrochemical reaction unit cell composite bodies arranged in a first direction, wherein at least one of the interconnector-electrochemical reaction unit cell composite bodies is an interconnector-electrochemical reaction unit cell composite body as claimed in claim 1.

8. The electrochemical reaction cell stack as claimed in claim 7, wherein the electrochemical reaction unit cell included in each of the interconnector-electrochemical reaction unit cell composite bodies is a fuel cell unit cell.

9. A method of manufacturing interconnector-electrochemical reaction unit cell composite body as claimed in claim 1, which comprises:

a cell preparation step of preparing the electrochemical reaction unit cell;

a press step of forming the interconnector by press working into a shape in which the interconnector has a plurality of combinations of protrusions protruding in the first direction and recesses provided on a side opposite the protrusions in the first direction and being concave toward the protrusions; and an assembly step of combining the electrochemical reaction unit cell and the interconnector, wherein the press step forms the interconnector into a shape in which, in a section parallel to the first direction, the recess is located within the range of the width t2 of the protrusion in the second direction, and the width t1 of the recess in the second direction is smaller than the width t2 of the protrusion.

10. The electrochemical reaction cell stack as claimed in claim 1 which satisfies a relation of $0.563 \leq h/H \leq 0.690$.

* * * * *